E. P. HARRIS.
Seed Planter.

No. 78,281.

Patented May 26, 1868.

Witnesses:
W. C. Ashkettle
J. A. Fraser

Inventor:
E. P. Harris
per Munn & Co.
Attorneys

United States Patent Office.

E. P. HARRIS, OF CONNEAUTVILLE, PENNSYLVANIA.

Letters Patent No. 78,281, dated May 26, 1868.

IMPROVEMENT IN SEED-PLANTER.

The Schedule referred to in these Letters Patent and making part of the same.

TO ALL WHOM IT MAY CONCERN:

Be it known that I, E. P. HARRIS, of Conneautville, in the county of Crawford, and State of Pennsylvania, have invented a new and improved Seeding-Machine; and I do hereby declare that the following is a full, clear, and exact description thereof, which will enable those skilled in the art to make and use the same, reference being had to the accompanying drawings, forming part of this specification.

This invention relates to a new and improved machine for sowing seed of various kinds, and may be adapted for planting potatoes.

The invention consists in a peculiar construction of certain parts, hereinafter fully shown and described, whereby an exceedingly simple and efficient device for the purpose specified is obtained.

In the accompanying sheet of drawings—

Figure 1:
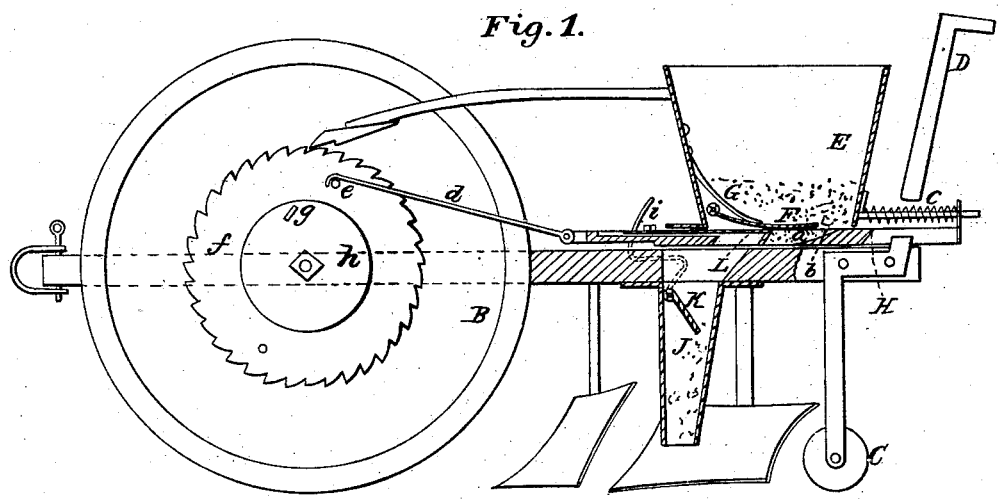
Figure 2:
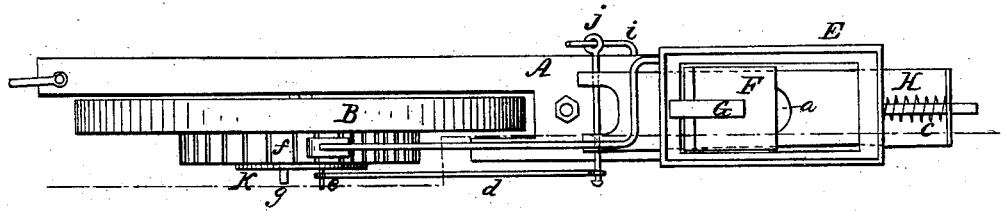

Figure 1 is a side sectional view of my invention, taken in the line $x\ x$, fig. 2.

Figure 2, a plan or top view of the same.

Similar letters of reference indicate corresponding parts.

A represents the beam of the device, the front end of which is supported by a wheel, B, and the rear end supported by a roller, C, as shown clearly in fig. 1.

This beam has two handles, D D, attached to it, and on the beam there is placed a seed-box, E, in which is a cut-off, F, kept down by a spring, G, as shown clearly in fig. 1.

Underneath the seed-box E there is placed, and allowed to slide freely, a bar, H, having an aperture, $a$, made through it, which is rounded at its rear end, and bevelled or inclined, as shown at $b$ in fig. 1.

The bar H has a reciprocating movement given it by means of a spring, $c$, and a rod, $d$, which is attached to it, and catches over a pin, $e$, which projects from a ratchet, $f$, attached to the side of wheel B, concentric with it, the front end of the rod $d$ being of hook-form, to catch over the pin, said rod being freed from the pin at the proper time by coming in contact with a projection, $g$, on a circular plate, $h$, which is secured stationary on the fixed axle on which the wheel B turns.

The rod $d$ may be disengaged from the pin $e$ at any time, by actuating a lever, arranged in any proper way.

J is the seed-spout, into which the seed are discharged from the aperture $a$ in the slide-bar H.

This seed-spout J has a valve, K, placed within it, one end of which is provided with a crank, $i$, which passes through an eye, $j$, in the front part of the slide-bar H, the valve K closing as the slide-bar moves forward, so as to catch all the seed discharged from the aperture $a$ each time said aperture passes over the spout J.

The cut-off F takes off the superfluous seed without cutting, breaking, or injuring it in the least.

The valve K admits of the seed being discharged at the precise point with certainty, and from the spout itself.

In order to plant potatoes, a slide, provided with a mortise, may be used instead of the slide-bar H, and a slide, L, may be attached to the bar, for the purpose of varying the capacity of the aperture $a$, as occasion may require.

I claim as new, and desire to secure by Letters Patent—

1. The cut-off F, with the spring G, in connection with the aperture $a$ in the slide-bar H, provided with the inclined rear end $b$, all arranged substantially as and for the purpose specified.

2. The slide L, applied to the slide-bar H in relation with the aperture $a$, substantially as and for the purpose set forth.

E. P. HARRIS.

Witnesses:
M. M. MEYBER,
I. NORTON.